United States Patent [19]

Iihoshi et al.

[11] Patent Number: 5,016,007
[45] Date of Patent: May 14, 1991

[54] APPARATUS FOR DISPLAYING TRAVEL PATH

[75] Inventors: Akira Iihoshi, Saitama; Yukinobu Nakamura, Tokyo, both of Japan

[73] Assignee: Honda Giken Kogyo Kabushiki Kaisha, Tokyo, Japan

[21] Appl. No.: 277,417

[22] Filed: Nov. 29, 1988

Related U.S. Application Data

[63] Continuation of Ser. No. 849,101, Apr. 7, 1986, abandoned.

[30] Foreign Application Priority Data

Apr. 19, 1985 [JP] Japan .................................. 60-84928
Apr. 19, 1985 [JP] Japan .................................. 60-84929

[51] Int. Cl.⁵ .............................................. G08G 1/123
[52] U.S. Cl. ................................ 340/995; 73/178 R; 364/449
[58] Field of Search ............... 340/988, 989, 990, 994, 340/995; 364/449, 444, 443, 424, 460; 353/12; 358/103; 73/178 R; 342/58, 119

[56] References Cited

U.S. PATENT DOCUMENTS

| | | | |
|---|---|---|---|
| 4,057,708 | 11/1977 | Greeley et al. | 342/58 |
| 4,084,241 | 4/1978 | Tsumura | 340/995 |
| 4,403,291 | 9/1983 | Von Tomkewitsch | 340/995 |
| 4,484,192 | 11/1984 | Seitz et al. | 340/995 |
| 4,532,514 | 7/1985 | Hatano et al. | 340/995 |
| 4,535,335 | 8/1985 | Tagami et al. | 340/988 |
| 4,543,572 | 9/1985 | Tanaka et al. | 340/995 |
| 4,638,438 | 1/1987 | Endo et al. | 340/995 |
| 4,688,176 | 8/1987 | Hirata | 364/449 |

Primary Examiner—Joseph A. Orsino
Assistant Examiner—Brent A. Swarthout
Attorney, Agent, or Firm—Lyon & Lyon

[57] ABSTRACT

An apparatus for displaying a travel path of a running body, such as a vehicle in which a constantly changing location of the running body is successively computed and the current location of said running body is displayed successively, in accordance with the data thus computed, on a display screen having a map previously displayed thereon, which comprises means for dividing patterns of roads on said map and the path of travel of the running body into line segments to effect pattern recognition according to the polygonal approximation and means for producing a display of the travel path in accordance with the line segments of the road to which the matching of the pattern recognition has been attained.

14 Claims, 5 Drawing Sheets

APPARATUS FOR DISPLAYING TRAVEL PATH

This is a continuation of co-pending application Ser. No. 849,101 filed on Apr. 7, 1986, and now abandoned.

BACKGROUND OF THE INVENTION

1. Field of the Invention

The present invention relates to a travel path displaying apparatus in which a current location and a path of travel of a running body, such as an automobile, (hereinafter referred to as a vehicle) are displayed on a display screen which has a map previously displayed thereon.

2. Description of the Prior Art

In an attempt to prevent a driver of a vehicle from losing his way in driving, for example in a strange place, off his desired travel path, there has been developed a travel path displaying apparatus including a distance detector for detecting a distance of travel depending upon a running speed of the vehicle and a direction detector for detecting a running direction and an amount of change of direction, from time to time, wherein the current location of the vehicle on X-Y coordinates is successively computed from the respective results of the above-mentioned detections and the location thus computed is memorized and displayed in the form of a constantly changing pattern of continuous point informations on a display screen having a map including roads or the like previously displayed thereon, so that the driver may confirm the current location of his vehicle.

In such a travel path displaying apparatus it is inevitable that some error in displayed position may occur as the vehicle travels, owing to such factors as accuracies of detections when the distance and/or direction detections are effected and such error in displayed position may increase cumulatively as the vehicle advances, so that the current location and the path of travel displayed may come off the correct road on the map. Then the driver cannot judge the location of the road on the map where he is driving.

Heretofore, a method for correcting such error in position on the basis of interrelation between a pattern of roads on the map and a pattern of the path of travel has been proposed. According to this method, in order to find out a road pattern which corresponds to a pattern of path of travel where the vehicle has passed, a few routes which are considered to correspond to the path through which the vehicle has passed are firstly selected from the complicated road pattern in any manner, and then the respective ones of said routes are separately examined as to adaptability to the path of travel. Thus a road having a pattern most resembling the path of travel is assumed to be the one through which the vehicle has passed and the route of travel is displayed on the corresponding portion of road on the map.

Such method of correction has a drawback in the case where a route which is considered to correspond to the path of travel is to be found out on a map including complicatedly connected roads. In such case, a lot of road patterns may be selected in the first stage and, accordingly, the processing for matching the respective ones of the selected road patterns and the pattern of the path of travel of the vehicle requires considerable time. Furthermore, in the case where the vehicle has passed through a road which is not displayed on the map, it is impossible to effect the matching process between the road patterns and the travel path pattern, so that the correction cannot be made. Particularly in a case where the vehicle has passed through a road which is not indicated on the map or the map includes some mistake or deformation of road, it is impossible to effect the matching of patterns, so that the correction of path of travel becomes interrupted.

OBJECTS OF THE INVENTION

It is a first object of the present invention to provide an apparatus for displaying a travel path of a moving body in which the path of travel is found out while it is prevented from coming off a road indicated on a map and the path of travel of the moving body is displayed on a display screen together with the current location of said moving body.

It is a second object of the present invention to provide an apparatus for displaying a travel path of a moving body in which the correction of the path of travel is effected while the matching of patterns of the roads on the map and the path of travel of the automobile is effected with ease, and particularly in a case where the vehicle is running on a road which is not indicated on a map, it is possible to continuously effect the correction of the path of travel.

SUMMARY OF THE INVENTION

In order to attain the first object as described above, there is provided an apparatus for displaying a travel path of a vehicle in which the relaxation method, one of the pattern recognition techniques, is utilized. The apparatus comprises means for dividing patterns of roads on a map and the path of travel of the vehicle into line segments, respectively, to effect pattern recognition according to polygonal approximation, by line segments thereby attaining matching of the respective patterns, and means for producing a display of the travel path on the basis of the line segments of the road to which the matching has been attained.

In order to attain the second object as described above, the present invention provides an apparatus for displaying a travel path of a vehicle in which the relaxation method, one of the pattern recognition techniques, is utilized, which comprises means for dividing patterns of roads on a map and the path of travel into line segments, respectively, to effect pattern recognition according to polygonal approximation thereby attaining matching of the patterns, means for setting virtual line segments to attain the matching if the above-mentioned matching of patterns is not attained, and means for producing a display of the travel path on the basis of the line segments of the road to which the matching has been attained.

DETAILED DESCRIPTION OF THE PREFERRED EMBODIMENT

An embodiment of the present invention will be described with reference to the accompanying drawings.

Figure 1:
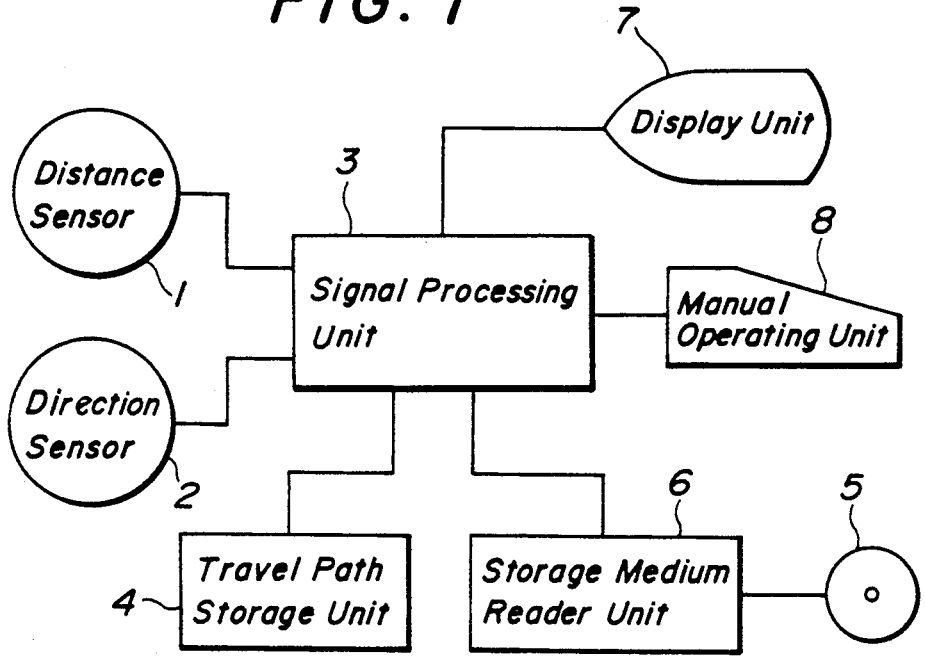
FIG. 1 is a block diagram showing an embodiment of the travel path displaying apparatus according to the present invention.

FIG. 1 shows an example of the construction of the travel path displaying apparatus according to the present invention with the principle components identified by the legends on FIG. 1. The distance sensor 1 of photoelectric, electromagnetic, mechanical contact type or the like, generates pulse signals at every unit of distance, depending on the rotation of the wheel of the vehicle; for example. The direction sensor 2 generates signals proportional to the amount of change of running direction of the vehicle which consists of a gyroscope, for example, for detecting the change of angular velocity in the yawing direction. The signal processing unit 3 serves to count the number of the pulse signals sent from the distance sensor 1 to measure the distance of travel of the vehicle and also serves to decide the change of the running direction of the vehicle on the basis of the output signal of the direction sensor 2 to successively compute the current location of the vehicle on the X-Y coordinates at every unit distance of travel of the vehicle. The unit 3 includes a CPU for effecting centralized control of the whole system, a programming ROM, and a controlling RAM. The travel path storing means (RAM) 4 successively stores the data of the constantly changing location on the X-Y coordinates obtained by the signal processing unit and holds the data as finite and continuous location information corresponding to the current locations of the vehicle. The map information storage medium 5 holds a previously stored plurality of file units of map information. The storage medium reader unit 6 selectively reads out the desired map file from the storage medium 5. The display unit 7 successively renew and display the current locations of the vehicle, the path of travel and the current running direction and the other information on the same display screen on the basis of the location data stored in the storage unit 4. The manual operating unit 8 gives a command for operation to the signal processing unit 3 and effects various operations including selection of the map to be displayed unit 7, setting of the starting point of the vehicle on the displayed map, change of directions of the displayed map and the travel path, shifting of the displayed position, change of the setting of the displayed form such as the partial enlargement of the display of the map and the travel path, and selection of the reduction scale and the like.

Figure 2:
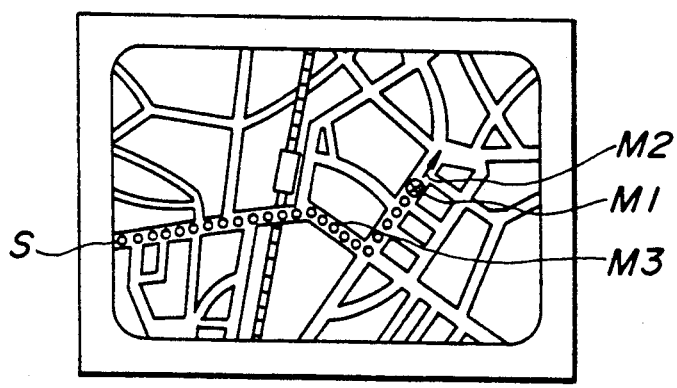
FIG. 2 shows an example of the display produced by the embodiment shown in FIG. 1.

In the construction as described above, the selected read out map is displayed on the display screen of the display unit 7, while the current location (x, y) on the X-Y coordinates is successively computed, as the vehicle travels from the starting point set on the map, by means of the signal processing unit 3 on the previously set reduction scale of the map. The result of the computation is successively sent to the travel path storage unit 4, so that the content of the storage is renewed, constantly read out and sent to the display unit 7. As shown in FIG. 2, the display unit 7 has a display mark M1 indicating the current location of the vehicle on the map displayed on the display screen, a display mark M2 indicating the running direction of the vehicle at the current location and a display mark M3 indicating the travel path from the starting point S to the current location. These marks simulate the running status of the vehicle.

The construction and the operation thus far described are the same as those of the conventional travel path displaying apparatus explained in the beginning of this specification.

Figure 3:
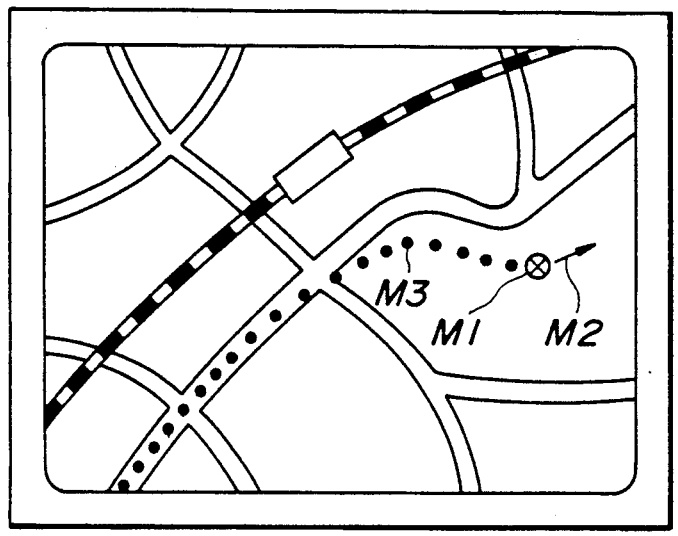
FIG. 3 shows a status of the display where the travel path has come off the road.

Such a travel path displaying apparatus has the drawback as hereinbefore described. That is, as the vehicle travels, the errors become accumulated so that the current location and the travel path become off the road displayed on the display screen, as shown in FIG. 3, until it becomes impossible for the driver to judge the position on the map where he is actually driving.

The present invention aims at eliminating such a drawback of the conventional apparatus.

The first invention provides a travel path displaying apparatus of this kind which includes, particularly in the signal processing unit 3, means for dividing the respective patterns of the roads on the map and the travel path into line segments according to the polygonal approximation and effecting pattern recognition and means for producing a display of the travel path on the basis of the line segments of the road to which the matching has been obtained by the pattern recognition.

The second invention provides a travel path displaying apparatus of this kind which includes, particularly in the signal processing unit 3, means for dividing the respective patterns of the roads on the map and the travel path into line segments according to the polygonal approximation and selecting proposed line segments of the road according to the characteristic amounts of the line segments of the travel path, means for providing a virtual road, if the proposed line segments cannot be obtained, and setting proposed line segments of the virtual road, means for pattern recognition to provide matching of the line segments of the travel path and the corresponding line segments of the proposed line segments and means for producing a display of the travel path according to the proposed line segments to which the matching has been attained by the pattern recognition.

Figure 4:
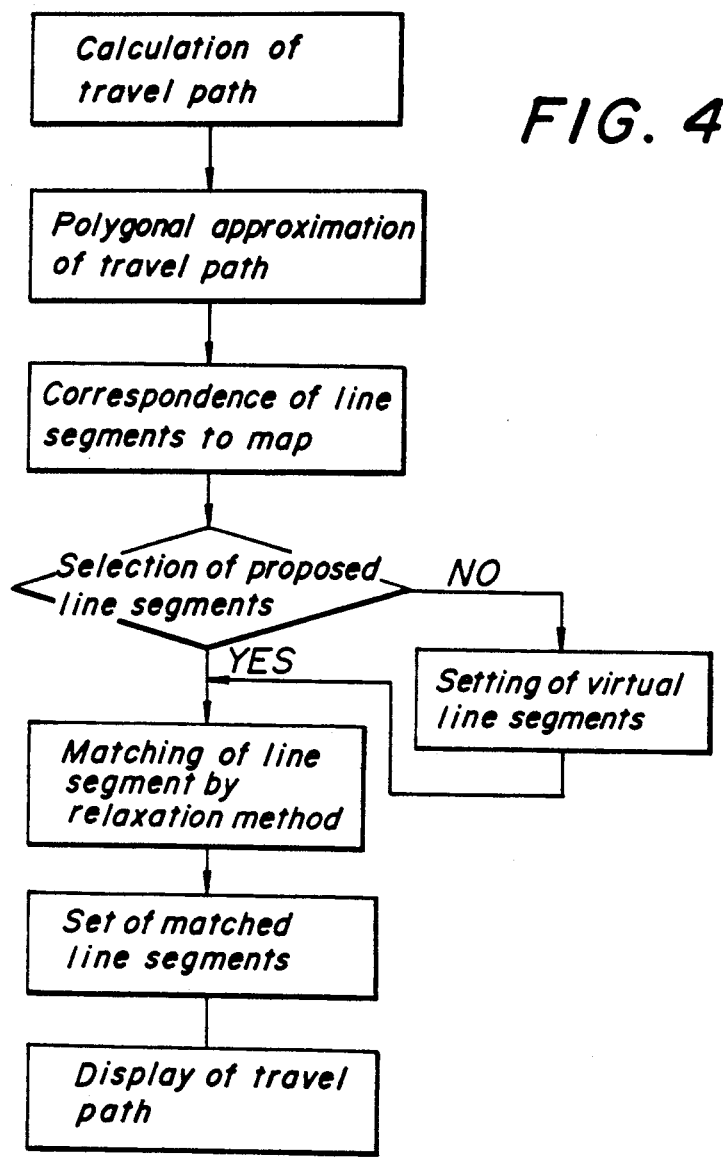
FIG. 4 is a flow chart showing the process of the pattern recognition in embodying the present invention.

FIG. 4 shows the successive steps of the signal processing unit 3 as described above. The travel path obtained as described above is divided into line segments to effect the polygonal approximation. A list of these line segments is prepared. Then, the list is compared with a list of the line segments of the roads on the map which have been previously processed by the polygonal approximation and some number of proposed line segments on the map which seem to correspond to those of the travel path are selected.

If the proposed line segment could not be found, it is judged that the vehicle is running on a road which is not indicated on the map or that the map includes some mistake of illustration or deformation, and virtual proposed line segments corresponding to the line segments of the travel path are found.

Then, the respective proposed line segments selected on the map (including virtual ones) and the line segments of the travel path are subjected to the pattern recognition of relaxation method, that is, the pattern recognition is effected in such manner that the matching of the line segment currently subjected to the pattern recognition is attained while considering the connection of said line segment with a line segment to which the matching has been previously attained. A matching index which indicates the degree of the corresponding relation of the respective line segments is obtained by the computation and it is renewed according to the coefficient of adaptability. The matching index provides a probability that the line segments may coincide with each other and the pattern recognition process is repeated until the proposed line segment which completely coincides with the line segment of the travel path becomes found among the proposed line segments which have been selected on the map.

Finally, the line segments on the map each of which completely corresponds to each of the line segments of the travel path are collected and the group of these line segments is used to display the travel path with the map by the display unit 7.

Figure 5:
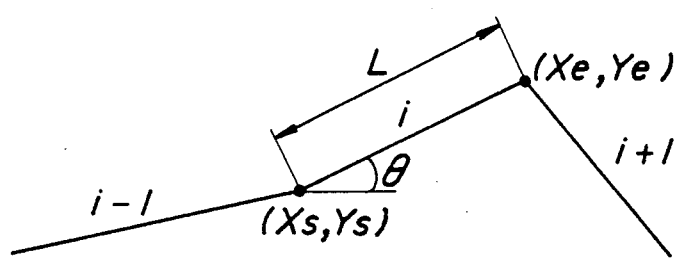
FIG. 5 is a diagram showing the travel path obtained by the polygonal approximation from the line segments.

The list of the line segments of the travel path includes data concerning position of starting point (Xsi, Ysi), angle of inclination $\theta i$, length Li, position of end point (Xei, Yei) of each line segment i (i=1~m) of the travel path which has been subjected to the polygonal approximation, as shown in FIG. 5. This list is made as shown in the following Table 1, for example.

TABLE 1

| No. | (Xs,Ys) | $\theta$ | L | (Xe,Ye) |
|---|---|---|---|---|
| 1 | (4,6) | 10 | 20 | (7,10) |
| 2 | (7,10) | 2 | 15 | (9,20) |
| . | . | . | . | . |
| i | (Xsi,Ysi) | $\theta i$ | Li | (Xei,Yei) |
| . | . | . | . | . |
| m | (Xsm,Ysm) | $\theta m$ | Lm | (Xem,Yem) |

Figure 6:
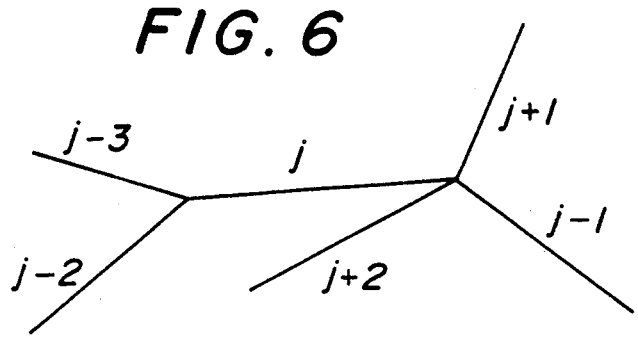
FIG. 6 is a diagram showing the road on the map which is subjected to the polygonal approximation by the line segments.

The list of the line segments of the roads on the map includes data concerning position of starting point (Xsj, Ysj), angle of inclination $\theta j$, length Lj, position of end point (Xej, Yej) of each line segment j (j=1~m) of the road which has been subjected to the polygonal approximation, as shown in FIG. 6. This list, together with the number of each line segment connected to the starting and end points, is made as shown in the following Table 2, for example. It is to be noted that the list of the line segments on the map is previously prepared and stored in a memory of the system.

TABLE 2

| No. | (Xs,Ys) | $\theta$ | L | (Xe,Ye) | No of starting point of line segment connected | No of end point of line segment connected |
|---|---|---|---|---|---|---|
| 1 | (7,3) | 2 | 9 | (4,1) | 3 | 2 |
| 2 | (4,1) | 4 | 7 | (10,2) | 1 | 4 5 |
| . | . | . | . | . | . | . |
| j−3 | . | . | . | . | . | j j−2 |
| j−2 | . | . | . | . | . | j j−3 |
| j−1 | . | $\theta j$ | Lj | . | j j+1 j+2 | . |
| j | (Xsj,Ysj) | . | . | (Xej,Yej) | j−3 j−2 | j−1 j+1 j+3 |
| j+1 | . | . | . | . | j j−1 j+2 | . |
| j+2 | . | . | . | . | j j−1 j+2 | . |
| . | . | . | . | . | . | . |
| n | (Xsn,Ysn) | $\theta n$ | 5 | (Xen,Yen) | . | . |

The selection of the proposed line segments on the map corresponding to the line segment i of the travel path is effected as follows. Referring to the line segment i of the travel path and the line segment j on the map, it is assumed that the difference in angle of inclination is $d\theta$, the difference in length is dL, the distance between the starting points is dS, and the distance between the end points is dE. Using predetermined values of allowances $\alpha 1$, $\alpha 2$, $\alpha 3$ and $\alpha 4$, depending upon the respective characteristic amounts as mentioned above, the line segments on the map which satisfy all of the conditions expressed by the following equations (1)-(4) are selected as the proposed line segments.

$$d\theta = |\theta i - \theta j| \leq \alpha 1 \tag{1}$$

$$dL = |Li - Lj| \leq \alpha 2 \tag{2}$$

$$dS = \sqrt{(Xsi - Xsj)^2 + (Ysi - Ysj)^2} \leq \alpha 3 \tag{3}$$

$$dE = \sqrt{(Xei - Xej)^2 + (Yei - Yej)^2} \leq \alpha 4 \tag{4}$$

Figure 7:
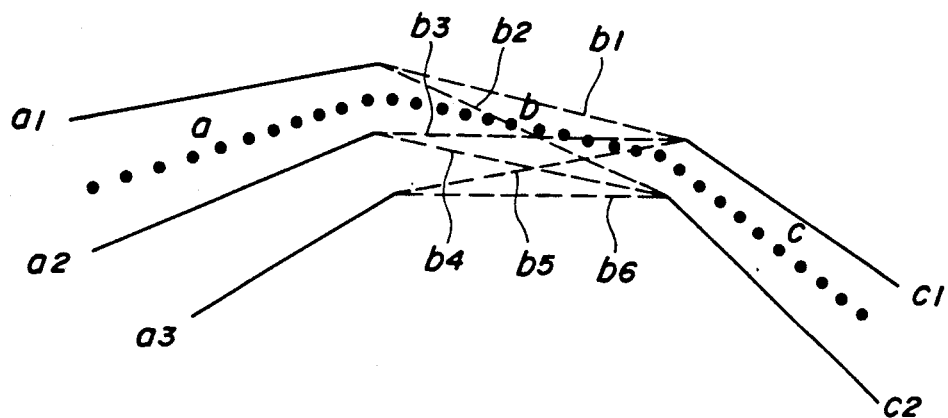
FIG. 7 is a diagram showing the corresponding relation between the line segments of the travel path and those of the road when the virtual road is assumed.
Figure 8:
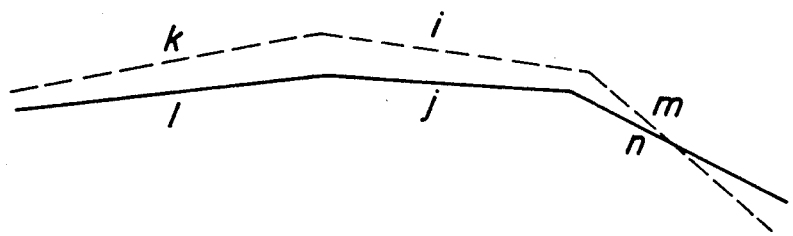
FIG. 8 is a diagram showing the corresponding relation between the travel path and the road on the map which have been subjected to the polygonal approximation.

When the proposed line segments on the map corresponding to the line segments of the travel path could not be selected, the determination of the virtual proposed line segments is effected in the following manner. For example, it is assumed that, there are three continuing line segments a, b and c, as shown in FIG. 7, and that the proposed line segments a1, a2 and a3 on the map have been selected in connection with the line segment a and the proposed line segments c1 and c2 have been selected in connection with the line segment c on the map but no line segment has been selected in connection with the line segment b because there is no corresponding road on the map. In such case, the line segments b1-b6 which connect the end points of the proposed line segments a1, a2 and a3 of the previous line segment a and the starting points of the proposed line segments c1 and c2 of the later line segment c are determined as the proposed line segments of the virtual road.

It is assumed that the matching index between the line segment i of the travel path and the proposed line segment j on the map is Pi(j). The value of this index is obtained by the following operation.

Firstly, the difference between the characteristic amounts between the line segment of the travel path and the proposed line segment is determined by the following equation.

$$P'i(j) = \{1 - \omega1 \times \max(d\theta - \beta1, 0) - \omega2 \times \max(dL - \beta2, 0) - \omega3 \times \max(dS - \beta3, 0) - \omega4 \times \max(dE - \beta4, 0)\} \quad (5)$$

Wherein $\omega1-\omega4$ indicate the weighting values of the respective characteristic amounts, which change depending upon the degree of errors of the respective sensors 1 and 2 used in the travel path displaying apparatus, and $\beta1-\beta4$ indicate the ranges of error corresponding to the small differences of the respective characteristic amounts.

Then, it is normalized according to the following equation to determine the matching index Pi(j).

$$Pi(j) = P'i(j) / \sum_j P'i(j) \quad (6)$$

The coefficient of adaptability at the time of renewal indicates the degree of resemblance between the connecting relation (angle difference, existence or absence of connection) of the starting and ending sides of the line segment i of the travel path and the connecting relation of the starting and ending sides of the proposed line segment j on the map. The coefficient of adaptability $\Gamma ik(j,l)$ at the starting side of the line segment j relative to the line segment i is determined by the following equation.

$$\Gamma ik(j,l) = \{1 - \omega r \times \max(|\theta i - \theta k| - |\theta j - \theta l| - \gamma, 0)\} \times D \quad (7)$$

The coefficient of adaptability $\Gamma im(j,n)$ at the ending side is determined in the same manner.

In the above equation, $\omega r$ is a weighting factor concerning the coefficient of adaptability, which changes depending upon the degree of error of the respective sensors 1 and 2 used in the travel path displaying apparatus. $\gamma$ indicates the range of error relative to the coefficient of adaptability and D indicates the coefficient of connection, the value of which is 1 under connected state and is 0 under non-connected state.

The renewal of the matching index is effected according to the operation expressed by the following equation.

$$\overset{n}{Pi(j)} = Qi(j) \cdot \overset{n-1}{Pi(j)} / \sum_j Qi(j) \cdot \overset{n-1}{Pi(j)} \quad (8)$$

where, $$Qi(j) = \frac{1}{2}\left[\max_l\left(\overset{n-1}{\Gamma ik(j,l) \cdot Pk(l)}\right) - \max_n\left(\overset{n-1}{\Gamma im(j,n) \cdot Pm(n)}\right)\right] \quad (9)$$

Figure 9:
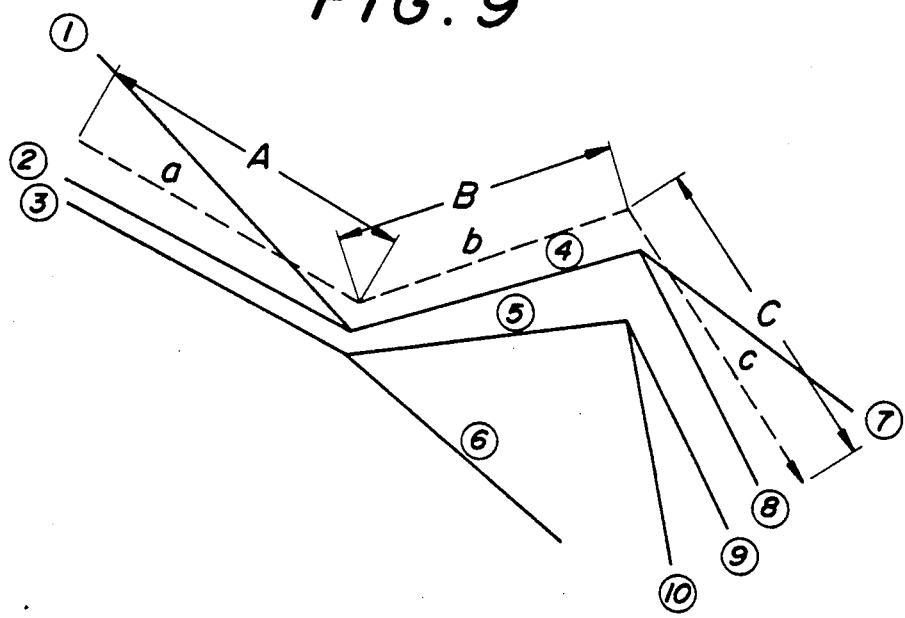
FIG. 9 is a diagram showing an example of the proposed line segments on the map.

For example, it is assumed that the travel path is formed by the line segments a, b and c, the proposed line segments [1], [2] and [3] have been selected in connection with the line segment a, the proposed line segments [4], [5] and [6] have been selected in connection with the line segment b and the proposed line segments [7], [8], [9] and [10] have been selected in connection with the line segment c, as shown in FIG. 9. In this drawing, A, B and C indicate the travel sections, respectively.

When the vehicle is running in the A section, the selection of the proposed line segments is effected, using the angle difference $d\theta a$ and the distance dSa between the starting points as the characteristic amounts and then the matching indexes Pa(1), Pa(2) and Pa(3) of the respective proposed line segments [1], [2] and [3] relating to the line segment a are determined. The proposed line segment having the matching index which became 100% is judged to be the travel path.

When the vehicle is running in the B section:
1. In connection with the line segment a, the selection of the proposed line segments is effected, using the angle difference $d\theta a$, the length difference dLa, the distance dSa between the starting points and the distance dEa between the ending points as the characteristic amounts. The matching indexes $P^0a(1)$, $P^0a(2)$ and $P^0a(3)$ of the respective proposed line segments [1], [2] and [3] are determined.
2. In connection with the line segment b, the selection of the proposed line segments is effected, using the angle difference $d\theta b$ and the distance dSb between the starting points, as the characteristic amounts. The matching indexes $P^0b(4)$, $P^0b(5)$ and $P^0b(6)$ of the respective proposed line segments [4], [5] and [6] are determined.

If a proposed line segment having 100% matching of the line segments a and b cannot be obtained, first renewal is effected.

$$P^1a(1) = \Gamma ab(1,4) \times P^0b(4) \times P^0a(1)$$
$$= Qa(1) \times P^0a(1)$$
$$P^1a(2) = \Gamma ab(2,4) \times P^0b(4) \times P^0a(2)$$
$$= Qa(2) \times P^0a(2)$$

when, $$\Gamma ab(3,5) \times P^0b(5) > \Gamma ab(3,6) \times P^0b(6)$$

$$P^1a(3) = \Gamma ab(3,5) \times P^0b(5) \times P^0a(3)$$
$$= Qa(3) \times P^0a(3)$$

when, $$\Gamma ab(1,4) \times P^0b(1) < \Gamma ab(2,4) \times P^0b(2)$$

$$P^1b(4) = \Gamma ab(2,4) \times P^0a(2) \times P^0b(4)$$
$$= Qb(4) \times P^0b(4)$$

$$P^1b(5) = \Gamma ab(3,5) \times P^0a(3) \times P^0b(5)$$
$$= Qb(5) \times P^0b(5)$$

$$P^1b(6) = \Gamma ab(3,6) \times P^0a(3) \times P^0b(6)$$
$$= Qb(6) \times P^0b(6)$$

Further, if a proposed line segment having 100% matching of the line segments a and b cannot be obtained, second renewal is effected.

$$P^2a(1) = \Gamma ab(1,4) \times P^1b(4) \times P^1a(1)$$
$$= \Gamma ab(1,4) \times Qb(4) \times P^0b(4) \times Qa(1) \times P^0a(1)$$
$$= \{Qa(1)\}^2 \times Qb(4) \times P^0a(1)$$

$$P^2a(2) = \Gamma ab(2,4) \times P^1b(4) \times P^1a(2)$$
$$= \Gamma ab(2,4) \times Qb(4) \times P^0b(4) \times Qa(2) \times P^0a(2)$$
$$= \{Qa(2)\}^2 \times Qb(4) \times P^0a(2)$$

when, $$\Gamma ab(3,5) \times P^1b(5) > \Gamma ab(3,6) \times P^1b(6)$$
$$P^2a(3) = \Gamma ab(3,5) \times P^1b(5) \times P^1a(3)$$
$$= \Gamma ab(3,5) \times Qb(5) \times P^0b(5) \times Qa(3) \times P^0a(3)$$
$$= \{Qa(3)\}^2 \times Qb(5) \times P^0a(3)$$

when, $$\Gamma ab(1,4) \times P^1b(1) < \Gamma ab(2,4) \times P^1b(2)$$
$$P^2b(4) = \Gamma ab(2,4) \times P^1a(2) \times P^1b(4)$$
$$= \Gamma ab(2,4) \times Qa(2) \times P^0a(2) \times Qb(4) \times P^0b(4)$$
$$= \{Qb(4)\}^2 \times Qa(2) \times P^0b(4)$$

$$P^2b(5) = \Gamma ab(3,5) \times P^1a(3) \times P^1b(5)$$
$$= \Gamma ab(3,5) \times Qa(3) \times P^0a(3) \times Qb(5) \times P^0b(5)$$
$$= \{Qb(5)\}^2 \times Qa(3) \times P^0b(5)$$

$$P^2b(6) = \Gamma ab(3,6) \times P^1a(3) \times P^1b(6)$$
$$= \Gamma ab(3,6) \times Qa(3) \times P^0a(3) \times Qb(6) \times P^0b(6)$$
$$= \{Qb(6)\}^2 \times Qa(3) \times P^0b(6)$$

If a proposed line segment having 100% matching of the line segments a and b cannot be obtained again, the third, fourth—renewals are repeated. The proposed line segment in which 100% matching has been finally obtained is assumed to be the travel path of the vehicle.

When the vehicle is running in the C section:

1. In connection with the line segment a, the selection of the proposed line segments is effected, using the angle difference $d\theta a$, the length difference $dLa$, the distance $dSa$ between the starting points and the distance $dEa$ between the ending points as the characteristic amounts. The matching indexes $P^0a(1)$, $P^0a(2)$ and $P^0a(3)$ of the respective proposed line segments [1], [2] and [3] are determined.
2. In connection with the line segment b, the selection of the proposed line segments in effected, using the angle difference $d\theta b$, the length difference $dLb$, the distance $dSb$ between the starting points and the distance $dEb$ between the ending points, as the characteristic amounts. The matching indexes $P^0b(4)$, $P^0b(5)$ and $P^0b(6)$ of the respective proposed line segments [4], [5] and [6] are determined.
3. In connection with the line segment c, the selection of the proposed line segment is effected, using the angle difference $d\theta c$ and the distance $dSc$ between the starting points as the characteristic amounts. The matching indexes $P^0c(7)$, $P^0c(8)$, $P^0c(9)$ and $P^0c(10)$ of the selected proposed line segments [7], [8], [9] and [10] are determined.

If a proposed line segment having 100% matching of the line segments a and b cannot be obtained, first renewal is effected.

$$P^1a(1) = \Gamma ab(1,4) \times P^0b(4) \times P^0a(1)$$
$$= Qa(1) \times P^0a(1)$$
$$P^1a(2) = \Gamma ab(2,4) \times P^0b(4) \times P^0a(2)$$
$$= Qa(2) \times P^0a(2)$$

when, $$\Gamma ab(3,5) \times P^0b(5) > \Gamma ab(3,6) \times P^0b(6)$$
$$P^1a(3) = \Gamma ab(3,5) \times P^0b(5) \times P^0a(3)$$
$$= Qa(3) \times P^0a(3)$$

when, $$\Gamma ab(1,4) \times P^0b(1) < \Gamma ab(2,4) \times P^0b(2) \text{ and}$$
$$\Gamma bc(4,7) \times P^0c(7) < \Gamma bc(4,8) \times P^0c(8)$$
$$P^1b(4) = Qb(4) \times P^0b(4)$$

where, $$Qb(4) = \tfrac{1}{2}\{\Gamma ab(2,4) \times P^0a(2) + \Gamma bc(4,8) \times P^0c(8)\}$$

when $$\Gamma bc(5,9) \times P^0c(9) < \Gamma bc(5,10) \times P^01c(10)$$
$$P^1b(5) = Qb(5) \times P^0b(5)$$

where $$Qb(5) = \tfrac{1}{2}\{\Gamma ab(3,5) \times P^0a(3) + \Gamma bc(5,9) \times P^0c(9)\}$$

$$P^1c(7) = \Gamma bc(4,7) \times P^0b(4) \times P^0c(7)$$
$$= Qc(7) \times P^0c(7)$$

$$P^1c(8) = \Gamma bc(4,8) \times P^0b(4) \times P^0c(8)$$
$$= Qc(8) \times P^0c(8)$$

$$P^1c(9) = \Gamma bc(5,9) \times P^0b(5) \times P^0c(9)$$
$$= Qc(9) \times P^0c(9)$$

$$P^1c(10) = \Gamma bc(5,10) \times P^0b(5) \times P^0c(10)$$
$$= Qc(10) \times P^0c(10)$$

Further, if a proposed line segment having 100% matching of the lines a and b cannot be obtained, second renewal is effected.

$$P^2a(1) = \Gamma ab(1,4) \times P^1b(4) \times P^1a(1)$$
$$= \Gamma ab(1,4) \times Qb(4) \times P^0b(4) \times Qa(1) \times P^0a(1)$$
$$= \{Qa(1)\}^2 \times Qb(4) \times P^0a(1)$$

$$P^2a(2) = \Gamma ab(2,4) \times P^1b(4) \times P^1a(2)$$
$$= \Gamma ab(2,4) \times Qb(4) \times P^0b(4) \times Qa(2) \times P^0a(2)$$
$$= \{Qa(2)\}^2 \times Qb(4) \times P^0a(2)$$

-continued $$P^2a(3) = \Gamma ab(3,5) \times P^1b(5) \times P^1a(3)$$
$$= \Gamma ab(3,5) \times Qb(5) \times P^0b(5) \times Qa(3) \times P^0a(3)$$
$$= \{Qa(3)\}^2 \times Qb(5) \times P^0a(3)$$

$$P^2b(4) = Qb(4) \times P^1b(4)$$

when, $\Gamma ab(2,4) \times P^1a(2) > \Gamma ab(1,4) \times P^1a(2)$ and
$\Gamma bc(4,8) \times P^1c(8) > \Gamma bc(4,7) \times P^1c(7)$,
$Qb(4) = \frac{1}{2}\{\Gamma ab(2,4) \times P^1a(2) + \Gamma bc(4,8) \times P^1c(8)\}$
$P^2b(5) = Qb(5) \times P^1b(5)$ when, $\Gamma bc(5,9) \times P^1c(9) > \Gamma bc(5,10) \times P^1c(10)$,
$Qb(5) = \frac{1}{2}\{\Gamma ab(3,5) \times P^1a(3) + \Gamma bc(5,9) \times P^1c(9)\}$ $$P^2c(7) = \Gamma bc(4,7) \times P^1b(4) \times P^1c(7)$$
$$= Qc(7) \times P^1c(7)$$

$$P^2c(8) = \Gamma bc(4,8) \times P^1b(4) \times P^1c(8)$$
$$= Qc(8) \times P^1c(8)$$

$$P^2c(9) = \Gamma bc(5,9) \times P^1b(5) \times P^1c(9)$$
$$= Qc(9) \times P^1c(9)$$

$$P^2c(10) = \Gamma bc(5,10) \times P^1b(5) \times P^1c(10)$$
$$= Qc(10) \times P^1c(10)$$

If a proposed line segment having 100% matching of the line segments a and b cannot be obtained again, the third, fourth—renewals are repeated. The proposed line segment in which 100% matching has been finally obtained is assumed to be the travel path of the vehicle.

It will be understood that the present invention provides an apparatus for displaying a travel path of a vehicle which comprises means for dividing the travel path of the vehicle and roads on a map into line segments, respectively, to effect the polygonal approximation and prepare lists of data of the characteristic amounts of the respective line segments and means for effecting selection of proposed line segments on the map relative to line segments of the travel path in accordance with the data of said list while forming a continuous line segment and effecting the pattern recognition over the whole map according to the relaxation method. Accordingly, it is not necessary to select a plurality of roads on a map which form the subject of the pattern recognition relating to a travel path, as in the conventional apparatus, so that the pattern recognition can be performed in rapid and reliable manner and the precision of the pattern recognition based on the correspondence of line segments is increased as the travel path of the vehicle increases.

Furthermore, the apparatus according to the present invention is so constructed that the matching of the line segments which have been processed by the polygonal approximation is effected over the whole map and, consequently, with regard to a line segment of the travel path to which the matching could not been attained it is possible to judge that the vehicle has passed through a road which is not indicated on the map.

Figure 10:
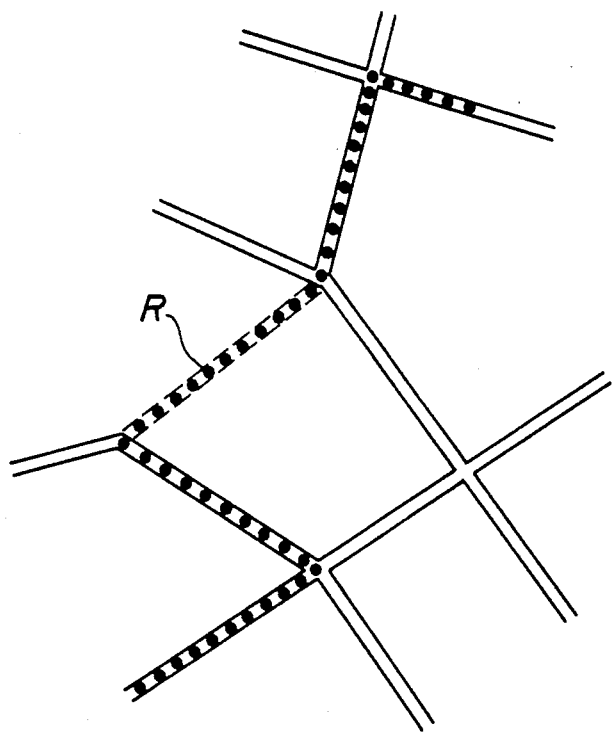
FIG. 10 is a diagram showing an example of the travel path displayed on the virtual road set on the map.

Particularly the present invention provides an apparatus which is so constructed that if a proposed line segment on a map corresponding to the line segment of the travel path is not obtained, a virtual road R is set, considering the connection of the line segment of the travel path, as shown in FIG. 10, and the matching is attained while determining a line segment continuing to preceding and succeeding line segment. Accordingly, even if the vehicle runs through a road not indicated on the map or there is a mistake of illustration or deformation in the map, it is possible to effectively follow thereto and to continually correct the travel path, without producing any interruption of correction of the travel path.

As will be understood from the above description, the present invention provides an apparatus for displaying a travel path of a vehicle in which the pattern of the roads on the map and that of the travel path of the vehicle are divided into the line segments, for the polygonal approximation, and the matching is effected by the pattern recognition using the relaxation method, and in which if the matching cannot be attained, the line segments concerning the virtual road are set to attain the matching and the display of the travel path is produced, according to the line segments of the road to which the matching has been attained. Thus the matching of the roads on the whole map and the travel path of the vehicle can be easily attained. Particularly, even when the vehicle travels through a road which is not indicated on the map it is possible to continuously effect the correction of the travel path.

Thus the apparatus for displaying the travel path of the vehicle according to the present invention has such advantages that the display of the travel path is effected, without causing the travel path to come off the road indicated on the map and without cumulatively increasing the error in location depending on the increase of the distance of travel as in the conventional apparatus and, in contrast therewith, the error in location is decreased as the vehicle advances, whereby the precision of the travel path is improved.

We claim:

1. An apparatus for displaying a travel path of a moving body in which locations of the moving body for every unit of travel distance on X-Y coordinates imposed on a road map are successively decided by computer processing, on the basis of outputs of a distance sensor for detecting a travel distance of the moving body and a direction sensor for detecting a direction of said travel, by means of a signal processing device and current locations of the moving body are renewably displayed on a display screen on which line segments of roads on the road map have been previously displayed, on the basis of data of the locations as decided above, comprising:

means for effecting polygonal approximation of the travel path of the moving body by line segments of said travel path, said travel path being obtained by storing the data of the locations of the moving body as decided by the above-mentioned computer processing according to a process previously programmed in said signal processing device;

selecting means for selecting proposed line segments of a road approximating the line segments of said travel path from the above-mentioned line segments of the roads on the road map in which data concerning the locations on the X-Y coordinates of the respective line segments of said travel path which have been previously approximated by polygonal approximation are stored in a memory, said selecting means including a comparing means for comparing characteristic amounts concerning positional relation between (1) the line segment of the travel path decided by the computer processing and (2) the line segment of the road to determine if the amounts fall within an allowable range;

means for effecting matching of a first pattern of the proposed line segments of the road on the road map as selected and a second pattern of the line segments of said travel path including comparing said first and second patterns and selecting a first pattern that is similar to the second pattern; and means for making the travel path coincide with said selected first pattern of the proposed line segments of the road on the road map to which the matching of the pattern has been effected.

2. An apparatus for displaying a travel path of a moving body according to claim 1, wherein the means for effecting matching of the pattern of the selected proposed line segments of the road and the pattern of the line segments of the travel path comprises (1) a pattern recognitions technique of a relaxation method and (2) a continuous pattern matching effected on the basis of interconnection between a line segment to which the matching has been previously attained and a line segment which is under processing.

3. An apparatus for displaying a travel path of a moving body according to claim 1 in which the characteristic amount is a difference in length between each line segment of the travel path and each line segment of the road.

4. An apparatus for displaying a travel path of a moving body according to claim 1 in which the characteristic amount is a difference in gradient between each line segment of the travel path and each line segment of the road.

5. An apparatus for displaying a travel path of a moving body according to claim 1 in which the characteristic amount is a difference between a starting point and an ending point of the respective line segments of the travel path and the road.

6. An apparatus for displaying a travel path of a moving body in which locations of the moving body for every unit travel distances on X-Y coordinates imposed on a road map are successively decided by computer processing, on the basis of outputs of a distance sensor for detecting a travel distance of the moving body and a direction sensor for detecting a direction of said travel, by means of a signal processing device and a current location of the moving body is renewably displayed on a display screen, on which line segments of roads on the road map have been previously displayed, on the basis of the locations as decided above, comprising:

means for effecting polygonal approximation of the travel path of the moving body by line segments, said travel path being obtained by storing the data of the locations of the moving body as decided by the above-mentioned computer processing according to a process previously programmed in said signal processing device;

selecting means for selecting proposed line segments of a road approximating the line segments of said travel path from the above-mentioned line segments of the roads on the road map in which data concerning the locations on the X-Y coordinates of the respective line segments of said travel path which have been previously approximated by polygonal approximation are stored in a memory, said selecting means including a comparing means for comparing characteristic amounts concerning positional relation between (1) the line segment of the travel path decided by the computer processing and (2) the line segment of the road to determine if the amounts fall within a predetermined allowable range;

means for deciding upon a proposed line segment on a virtual road, which does not correspond to a road on the road map, but which has interconnections with the proposed line segment of a road previously selected and the line segment of a road to be selected by the succeeding processing;

means for effecting matching of a pattern of the line segments of said travel path to a pattern of the line segments of the roads on the road map or of the virtual road; and means for making the travel path coincide with the proposed line segments of the road on the road map or of the virtual road to which the matching has been effected.

7. An apparatus for displaying a travel path of a moving body according to claim 6, wherein the means for effecting matching of the pattern of the selected proposed line segments of the road to the pattern of the line segments of the travel path comprises (1) a pattern recognitions technique of a relaxation method and (2) a continuous pattern matching effected on the basis of interconnection between a line segment to which the matching has been previously attained and a line segment which is under processing.

8. An apparatus for displaying a travel path of moving body according to claim 6 in which the characteristic amount is a difference in length between each line segment of the travel path and each line segment of the road.

9. An apparatus for displaying a travel path of a moving body according to claim 6 in which the characteristic amount is a difference in gradient between each line segment of the travel path and each line segment of the road.

10. An apparatus for displaying a travel path of a moving body according to claim 6 in which the characteristic amount is a distance between a starting point and an ending point of the respective line segments of the travel path and the road.

11. An apparatus for displaying a travel path of a moving body in which locations of the moving body on X-Y coordinates on a road map are successively decided by computer processing, on the basis of outputs of a distance sensor for detecting a travel distance of the moving body and a direction sensor for detecting a direction of said travel, by means of a signal processing device and a current location of the moving body is renewably displayed on a display screen, on which a road map has been previously displayed, on the basis of data of the locations as decided above, comprising:

means for dividing into line segments the travel path of the moving body obtained by storing the data of the locations of the moving body as decided by the above-mentioned computer processing according to a process previously programmed in said signal processing device and for obtaining data concerning position of the respective line segments on the X-Y coordinates on the road map;

means for effecting matching of a pattern of the line segments of a road on the road map to a pattern of line segments of the travel path; and means for making the travel path coincide with the pattern of the line segments of the road on the road map to which the pattern matching has been effected.

12. An apparatus for displaying a travel path of a moving body according to claim 11, wherein the data concerning the positions on the X-Y coordinates of the respective line segments of the travel path of the moving body and the road on the road map are data of starting positions and terminating positions of the respective line segments.

13. An apparatus for displaying a travel path of a moving body according to claim 11, wherein the respective line segments of the road on the road map have connections with each other.

14. An method for displaying a travel path of a moving body in which locations of the moving body on X-Y coordinates on a road map are successively decided by computer processing, on the basis of outputs of a distance sensor for detecting a travel distance of the moving body and a direction sensor for detecting a direction of said travel, by means of a signal processing device and a current location of the moving body is renewably displayed on a display screen, on which a road map has been previously displayed, on the basis of data of the locations as decided above, comprising the steps of:

dividing into line segments the travel path of the moving body obtained by storing the data of the locations of the moving body as decided by the above-mentioned computer processing according to a process previously programmed in said signal processing device and for obtaining data concerning position of the respective line segments on the X-Y coordinates on the road map;

effecting matching of a pattern of the line segments of a road on the road map to a pattern of line segments of the travel path; and making the travel path coincide with the pattern of the line segments of the road on the road map to which the pattern matching has been effected.

* * * * *